Oct. 16, 1945.  H. W. HABERL  2,387,146
MULTIPLE SIGNALING CARRIER SYSTEM WITH RELAYING PROTECTION
Filed Jan. 27, 1944   3 Sheets-Sheet 2
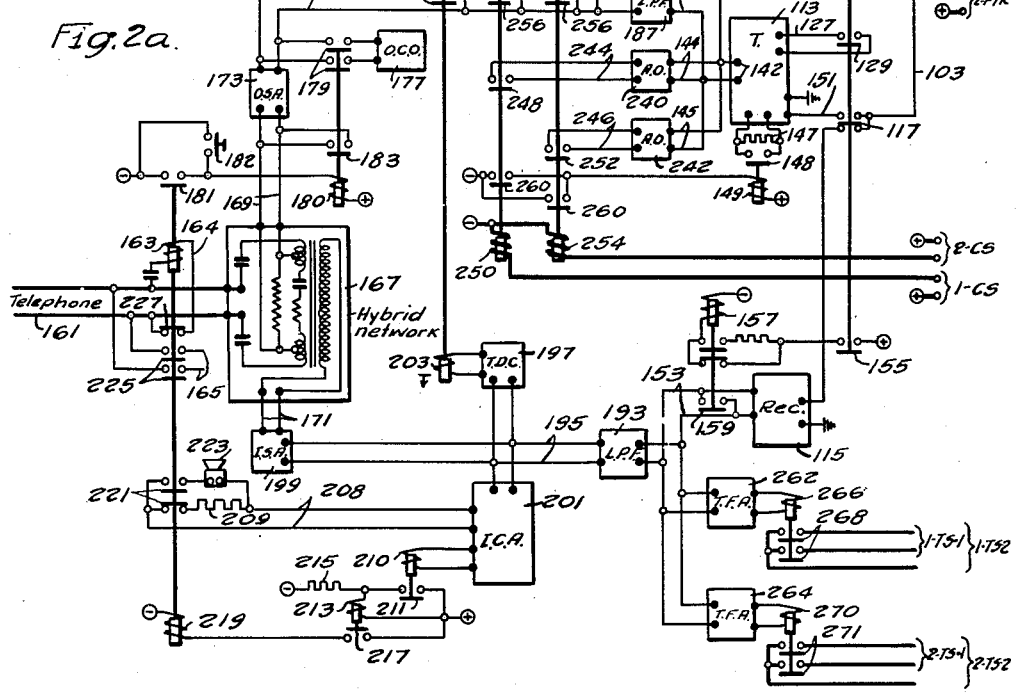
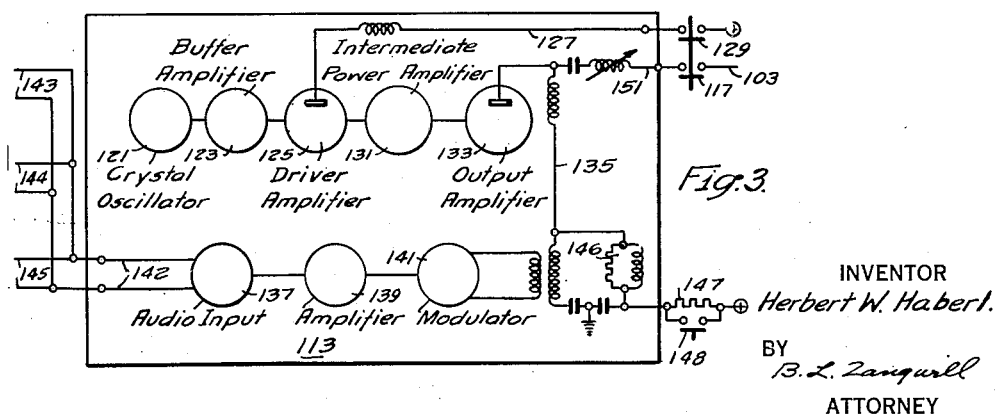
INVENTOR
Herbert W. Haberl.
BY
B. L. Zangwill
ATTORNEY Oct. 16, 1945.    H. W. HABERL    2,387,146
MULTIPLE SIGNALING CARRIER SYSTEM WITH RELAYING PROTECTION
Filed Jan. 27, 1944    3 Sheets-Sheet 3

WITNESSES:
E. A. McCloskey
Nw. C. Groome

INVENTOR
Herbert W. Haberl.
BY
B. L. Zanguill
ATTORNEY

Patented Oct. 16, 1945

2,387,146

UNITED STATES PATENT OFFICE 2,387,146

MULTIPLE SIGNALING CARRIER SYSTEM WITH RELAYING PROTECTION

Herbert W. Haberl, Hampstead, Quebec, Canada

Application January 27, 1944, Serial No. 519,884

26 Claims. (Cl. 179—2.5)

My invention relates to the application of carrier current for providing intercommunication signaling channels between a plurality of separated stations of an electric power distributing system, such as a transmission line, and for providing improved protective relaying for protecting the system in the event of line faults. My invention has particular application to a transmission line which is provided with a protective relaying means using directional and distance characteristics, the line having more than two separated stations or relaying points; but, in some of its aspects, my invention is not limited thereto.

It is now recognized that relatively high-speed protective relaying, clearing a faulted line-section in a fraction of a cycle or at most several cycles, minimizes possible damage and permits the line to carry heavier loads. Such high-speed relaying requires that the tripping relays at both ends of a protected line-section, which initiate the circuit-breaker operation at the associated end, be set into operation with a minimum of delay after a fault condition arises. For localized equipment or relatively closely spaced stations, high-speed relaying presents few, if any, difficulties. But to protect a line-section having widely spaced relaying points, which may be as much as several hundred miles apart, it is desirable to use a carrier system for coordinating the fault-responsive protective relaying means at each end of the protected line-section. Preferably, the carrier system coordinates the operations of the protective relaying means at each end, so as to cause the circuit-breakers at both ends to open substantially simultaneously for faults in either end-zone of a faulted line-section.

It is an object of my invention to provide a carrier-current protective relaying system which will not cause a false tripping action or even effect the carrier system during out-of-step or non-synchronous conditions, but which will immediately be operable for causing a tripping action should a fault arise, during such out-of-step condition, calling for circuit-breaker operation.

It is an important object of my invention to provide a carrier system for a long transmission line, providing high-speed protection for the line and also intelligence communication thereover; the carrier system being applicable to a transmission line consisting of a single long line-section terminating at two separated stations or to a plurality of long line-sections terminating at more than two separated stations, with telephony possible among all of the stations, one with any other.

A very important object of my invention resides in providing a carrier system for fully protecting a transmission line having a plurality of line-sections and for permitting telephonic conversation thereover, but in such manner that the line-protecting action predominates, being able to interrupt any telephony and providing the required line-interrupting operations upon the occurrence of a fault anywhere in a line-section.

It is a prime object of my invention to provide a carrier system for a transmission line having a plurality of long line-sections, which system uses a single carrier frequency to provide for both telephonic intercommunication and high-speed full length line-section protection.

According to my invention, each station of the transmission line is provided with carrier-current equipment comprising a transmitting-means and a receiving-means for the carrier, and each line-section is assigned a different relatively low modulating frequency. When a fault occurs on a line-section, near its end, that is in its end-zone, the transmitting-means at that end transmits the carrier at a relatively high frequency, which is common to the carrier system but which is modulated with the tone or frequency assigned to the faulted line-section. Only the receiving-means at the other or far end of the faulted line-section has operating means which responds to the tone, although other receiving-means also receive the modulated carrier.

A further important feature of my invention resides in the provision of a carrier system of a type described, which can be superimposed on existing line-protecting relaying-means for providing high-speed end-zone protection. Should the carrier-current equipment become inoperative, for any reason, the station protective relaying means respond in their normal manner, as if the carrier-current equipment were not there, to clear the line-section in the event of a fault but, of course, under conditions established by the protective relays.

It is another object of my invention to provide a carrier system of a type described comprising equipment which is highly sensitive, but is rugged and reliable.

My invention has other objectives, features, methods, purposes and arrangements, in addition to those set forth above. Some of these will be pointed out subsequently, or will be discernible from the following description of the invention and the accompanying drawings, in which an attempt has been made to make the invention easily understandable without burdening the description with details of parts which are within the knowledge of those skilled in the art.

In the drawings:

Fig. 2 is a symbolic diagrammatic view of carrier-current equipment at a relaying-point or station, which follows the teachings of my invention;

Fig. 2a is an explanatory table for the symbols applied to various parts of the equipment of Fig. 2;

Fig. 3 is a symbolic diagram of a transmitter embodying control circuits in accordance with a preferred form of my invention;

Figure 1:
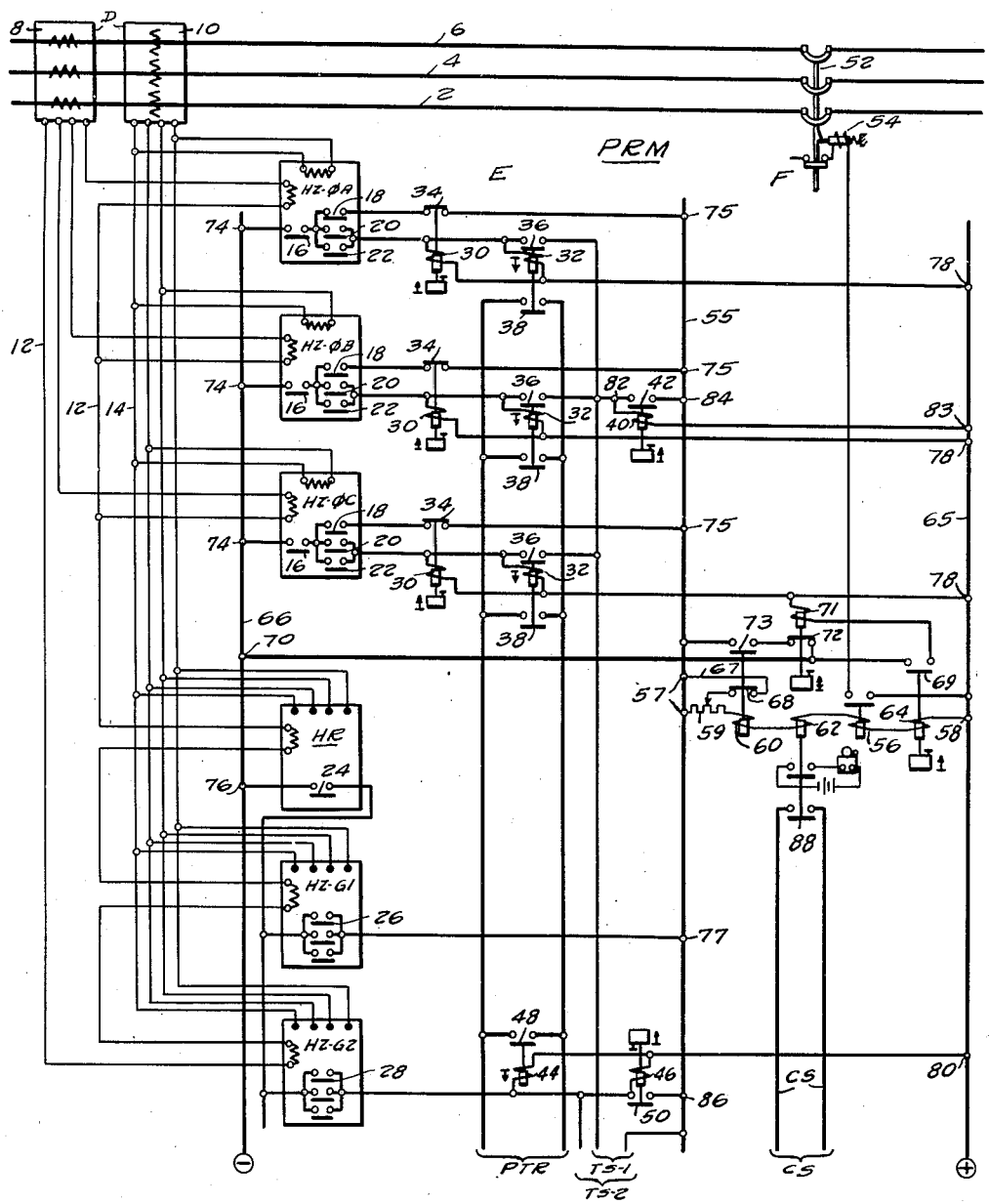
Figure 1 is a diagrammatic view of a somewhat conventional protective relaying means for a single relaying point of a transmission line, having connections for cooperation with carrier-current equipment, in accordance with my invention.

In the drawings I have adopted the scheme of showing all movable contacts for the relays as moving upwardly upon actuation through energization of the relay-coil and downwardly after deenergization of the relay-coil. Whether a circuit is made or broken depends on the position of the associated stationary contacts. Where parts are shown symbolically, usually in block form, an input to the part is generally represented by conductors ending in heavy dots inside the block or rectangle representing the part, and an output is generally represented by conductors starting in heavy dots on the periphery of the block or rectangle. When the same conductors can be either input or output conductors, dots have been placed both inside and on the periphery. Such dots can, of course, be considered terminals or connection points in some instances.

The symbolic wiring diagram of Fig. 1 shows an end of a three-phase line-section having a relaying point provided with protective relaying means PRM, the line-section comprising long phase-wires or line-conductors 2, 4 and 6 which extend for a considerable length beyond the portions shown in the figure.

Suitable current and voltage measuring means, comprising current and voltage measuring means 8 and 10, respectively, is coupled to the phase-wires for obtaining desired electrical quantities measurably representative of line-conditions as reflected at the relaying point. Measuring equipment of this kind is well known, and is symbolically shown as having four output conductors, including neutral conductors 12, for the current measuring means 8, and four output conductors, including a neutral conductor 14, for the voltage measuring means 10; but it should be understood that the specific form of the measuring means and number of output conductors will depend upon the particular electrical quantities desired for protective relaying purposes.

The output lines of the measuring means 8 and 10 are connected, in the preferred embodiment disclosed, to a fault-responsive relay-means E comprising direction and distance relays, the distance in this instance being measured by impedance, but other quantities can be used. Relays HZ—ØA, HZ—ØB and HZ—ØC are associated, respectively, with the different phases of the line-section, each comprising fast-operating contacts including a directional contact 16, a first-zone or first-stage contact 18, a second-zone contact 20 and a third-zone contact 22. For explanatory purposes, it may be said that the first-zone contact is operable when a fault arises which is spaced from it or its near end or relaying point a distance up to, say, 80% of the total distance to the other far end or relaying point of the line-section protected thereby. The second- and third-zone contacts operate when the faults lie respectively longer distances from the near relaying point, say to within about 50% and about 100% along the next adjacent line-section, respectively. In this description, when I refer to instantaneous operation or quick or fast operation, I use the terms as generally understood in the art, generally meaning that no time-delay is deliberately introduced for closing or opening, or both, so as to significantly affect a particular operation in a particular manner, but that the apparatus involved is quick or fast operating in the limits of practicably and economically built devices.

Zero-sequence or ground-fault relays are also provided, including a directional relay HR having a fast-operating contact 24, a first-zone impedance relay HZ—G1 having a fast-operating contact 26, and a second-zone impedance relay HZ—G2 having a fast-operating contact 28.

The protective relay-means E at each relaying point also includes a pair of parallelly-connected relays 30 and 32 for each phase. Each relay 30 has a quick-resetting normally-closed contact 34 which opens a preset time after the relay is energized; and each relay 32 upon energization, closes normally-open fast-closing slow-opening contacts 36 and 38. The contacts 36 control a common timer relay 40 which closes its normally-open contact 42 an appreciable time after it is energized, the time period being longer than that required to open a contact 34 after energization of its associated relay 30. Associated with the zero-sequence responsive relays are a relay 44 similar to the relay 32 and a timer relay 46 similar to the timer relay 40; the former having a fast-closing normally-open contact 48 and the latter a slow-closing normally-open contact 50.

For opening the line-section at the relaying point, line-interrupting means F is provided comprising a circuit-breaker 52 which is controlled by a trip-coil 54 in turn operated when a normally deenergized trip-bus 55 is connected to a power source. The trip-coil 54 is operated by a trip-relay 56 in a tripping circuit 57—58 which includes, in series connection, a resistor 59, a seal-in relay 60, a carrier-start relay 62, the trip-relay 56, and an intermittent make and break or vibrating relay 64.

The trip-circuit 57—58 is connected directly across the normally unenergized trip-bus 55 and the positive side of a direct-current source represented by a conductor or bus 65, the negative side of which is represented by a conductor or bus 66. In unenergized condition the trip-circuit 57—58 has a branch 67 including part of the resistor 59 and a normally closed contact 68 of relay 60, and in energized condition of the trip-circuit, the branch circuit 67 is open so that the resistor 59 is fully included. This permits quick operation and quick release of the seal-in relay 60. The relay 64 is slow to close its contact 69 which is in a resetting circuit starting at point 70, this circuit including a slow-opening and closing reset relay 71 having a contact 72. When relay 60 operates upon energization of the trip-circuit 57—58, it closes its upper contact 73, thereby establishing a holding circuit 70—72—73 which directly connects the trip-circuit 57—58 to the negative bus through contacts 72 and 73. After a time the contact 72 opens deenergizing the trip-bus and the tripping-circuit, and the relays 56, 60, 62, 64 and 71 can reset to normal condition.

Figure 4:
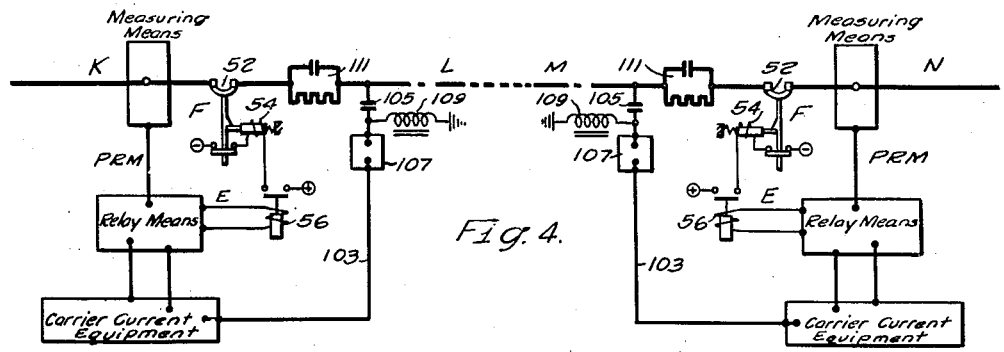
Fig. 4 is a symbolic diagram, in single line form, showing a single protected line-section embodying my invention.

A protective relaying means and circuit-breaker, such as shown in Fig. 1 are provided at each of the ends or relaying points K and N of a protected line-section, as schematically indicated in Fig. 4. Upon the occurrence of a fault in the central portion L—M of the line-section, common to the range of the first-zone impedance relays at K and N, the trip-bus 55 at each end is connected to the associated negative bus 66 either through a circuit 74—75 comprising a directional contact 16 and a first-zone contact 18 in series with a normally closed contact 34 of the relay 30, or through a circuit 76—77 comprising contacts 24 and 26 in series. Accordingly, the trip-circuits 57—58 at each relaying point K and N are energized, the tripping-relays 56 are energized, closing their contacts and energizing the trip-coils 54 which release their associated circuit-breakers 52, segregating both ends of the line-section. The trip-circuits are energized for a short time only, until the reset relay 71 opens its contact 72.

In the event of a fault in an end-zone K—L or M—N, each of which constitutes 20% of the line-section, the measuring means at the near end causes the first-zone contact of the relay-means thereat to operate and quickly cause a line-interrupting operation by opening the associated circuit-breaker 52, as in the case of a central fault. But at the relaying point at the other or far end of the line-section, the first-zone contacts do not close because the fault is beyond their setting. However, a longer-zone contact 20 and 22 in parallel or 28, at the far end, closes. Each of the contacts 20 and 22, when closed, completes a circuit 74—78 from the negative bus 66, through the directional contact 16, the contact 20 or 22, and the relays 30 and 32 in parallel, to the positive bus 65; and contact 28, when closed, completes a circuit 76—80 from the negative bus 66 through the directional contact 24, the contact 28, and the relays 44 and 46 in parallel, to the positive bus 65.

If a circuit 74—78 is the one that is completed, the energized slow-to-operate relay 30 opens its normally closed contact 34 after a time, but fast enough to prevent a false tripping operation in the event that an out-of-step condition causes a subsequent closure of the first-zone contact 18; since in out-of-step conditions the zoned contacts 22, 20 and 18 close slowly in that order and open slowly in reverse order.

Under the end-zone fault assumed, the relay 32, associated with the relay 30, also is energized, quickly closing its contact 38 which is in a "prepare-to-receive" circuit PTR to be later further described, and also quickly closing its contact 36 in a circuit 74—82—83 which includes the "slow-to-close" time relay 40, which operates slower than the relay 30. Energization of the relay 40 ultimately closes its contact 42, completing a circuit 74—82—84 to the trip-bus 55, thereby initiating a line-interrupting action, after a time depending on the setting of relay 40.

If the circuit 76—80 is the one that closes, the relay 44 quickly closes its contact 48 in parallel with the contacts 38 in the aforesaid "prepare-to-receive" circuit PTR. The slow-to-close time relay 46 ultimately closes its contact 50, completing a circuit 76—86 to the trip-bus 55, thereby causing a line-interrupting action.

With the measuring means and relay-means only at the ends of a line-section, a fault in an end-zone causes the circuit-breaker at the relaying point for that end-zone to operate immediately, but the circuit-breaker at the other end of the line-section will not operate until a time delay relay 40 or 46 closes its contacts, which involves a time-period. According to my invention, a carrier system is utilized which is capable of conveying some other form of signaling, or intelligence communication, between the relaying points at all times, but is rendered inoperable for this purpose during an end-zone fault, and instead is made to decrease or eliminate the aforesaid time-period of delay for energizing the trip-bus at the far end of the line-section so that the faulted line-section will be isolated quickly.

For cooperatively associating the relay-means at each relaying point with the carrier-system, for fast tripping at the far end in case of an end-zone fault at the other end, I make use of the fact that, in the described relay-means, while all zone contacts operate quickly upon energization of the associated relay HZ, the first-zone contacts instigate an operation which causes fast tripping, while the contacts of the other zones instigate an operation which causes tripping only after a time delay. At the near end of the line-section faulted in an end-zone, the first-zone contacts thereat operate quickly and place the carrier-current equipment thereat in a transmitting condition, irrespective of the condition of the carrier system prior thereto. At the far end, the first-zone contacts thereat do not operate for a fault in an end-zone as described, which is beyond its setting, and cannot force the carrier-current equipment thereat to transmitting condition. However, the second and third-zone contacts operate quickly, and these contacts control a circuit which places the carrier system in condition for receiving carrier-current relaying signals from the other end of the line provided that the associated first-zone contact is not operated. Accordingly, in each relay-means the action of the second and third-zone contacts on the carrier-current equipment is subordinate to that of their associated first-zone contacts, so that at the near end a first-zone contact, which has operated in response to a fault, takes precedence and causes carrier transmission. As soon as the faulted line-section is cleared, telephonic communication, thereover or, if desired, other intelligence communication, can be restored unless the fault is such as to absolutely prevent any passage of the carrier beyond it.

For these and other purposes, each relay-means E includes the quick-acting carrier-start relay 62 in its trip-circuit, this relay having a normally-open contact 88 in a carrier-start circuit CS, so that this circuit is closed at contact 88 when a tripping action is called for. For an end-zone fault, the first-zone contact at the near line-section end quickly causes energization of the trip-circuit and thereby causes closure of the carrier-start circuit CS which predominates in its action on the carrier-current equipment thereat, and causes it to transmit a relaying signal. At the far end the first-zone contact does not operate, but one of the other distance contacts do, thereby closing a circuit 74—78 or 76—80, and energizing a relay 32 or the relay 44 which quickly closes a normally-open contact 38 or 48 in the prepare-to-receive circuit PTR. This places the carrier-current equipment at the far end in receiving condition. Upon receiving the carrier relaying signal this equipment completes a normally-open timer shunting circuit TS—1 which by-passes or shunts the contact 42 of the timer relay 40, and a similar shunting circuit TS—2 which shunts the contact 50 of the timer relay 46, so that the trip-bus 55 can be connected, through a longer-zone contact, to the negative bus 66 for quick tripping through the shunting circuits, when its associated first-zone contact 18 has not operated.

The carrier system for relaying and communication is shown very schematically in the drawings, since the actual parts are generally conventional, and can be readily designed or obtained by those skilled in the art. The carrier-system comprises a carrier-current equipment at each station, which may serve more than one relaying point. Inasmuch as Fig. 1 is general and shows a relay-means useful at each relaying point, the carrier-start, the prepare-to-receive and the timer-shunt circuits have been generally represented as CS, PTR, and TS, respectively. Each carrier-current equipment has the continuation of these circuits for each protective relaying means coordinated therewith.

Referring to Fig. 2, phase-to-ground carrier transmission is shown, the carrier being fed to or taken from a phase-wire 2 through a single coaxial high-frequency transmission cable 103 and a coupling capacitor 105. An impedance matching unit 107, of any suitable form, is provided between the capacitor and cable 103 for properly terminating the cable 103 and coupling the load. A drain or grounding impedance coil 109 and a line wave-trap 111 confine the carrier current to the phase-wire 2 and bar switching shocks. In a specific preferred installation, which is hereinafter to be considered as the one referred to when specific data is mentioned, the carrier or high frequency is 172 kilocycles and is modulated for signaling with audio or low frequencies up to about 5000–6000 cycles. Accordingly, the line trap 111 is tuned to bar the carrier frequency and side bands up to about 6000 cycles therefrom. A transmission cable length of about one-half mile is used.

The other end of the coaxial transmission cable 103 is controllably connected either to a carrier transmitter 113 or a carrier receiver 115, through the front and back positions, respectively, of a contact 117 of a quick-acting change-over relay 119.

The transmitter 113 is schematically shown in Fig. 3, and may comprise a crystal oscillator 121, constantly weakly oscillating at carrier frequency, a buffer amplifier 123, a driver amplifier 125 having a tuned high-frequency plate-circuit, and a direct-current plate supply circuit 127, which includes, in series, a normally open contact 129 of the relay 119, an intermediate power amplifier 131, and an output amplifier 133 which comprises a plurality of tubes having a direct-current plate voltage and audio-frequency modulating circuit 135. The transmitter also comprises an audio-frequency input network 137, an amplifier 139, and a modulator 141 which is coupled to the circuit 135 for applying audio-frequency modulation to the carrier, in accordance with whatever signal is applied to input conductors 142 of the network 137. The transmitter is modulated either by speech applied to a pair of conductors 143 for telephonic communication, or by a selection of as many fixed audio-frequencies as desired, shown here as two. Different fixed modulating audio frequencies can be applied, respectively, to a pair of conductors 144 or 145, for protective relaying signaling, the pairs of conductors being connected to the input conductors 142.

The plate-voltage circuit 135 also includes a surge-suppressor 146 and a resistor 147 which holds down the power of the carrier. A contact 148, controlled by a quick-acting power-raise relay 149, shorts out the resistor 147 when the relay 149 is energized, thereby raising the output power of the transmitter. The carrier-current output circuit 151 of the transmitter is connected to the front position of the contact 117 so as to be connected to the phase-wire 2 when the change-over relay 119 is energized.

When the relay 119 is energized, its contact 129 closes the plate-voltage supply-circuit 127 to the driver amplifier 125 of the transmitter, so that carrier is immediately available at a power determined by the position of contact 148. In the exemplary embodiment 20 watts are delivered with the resistor 147 operable in the circuit 135 and 400 watts when the resistor is shorted. Since energization of relay 119 also moves contact 117 to its front position, the high power carrier obviously is applied to the phase-wire 2 through the connecting apparatus including the cable 103.

The receiver is tuned to provide good selectivity at and for about 6000 cycles from carrier frequency with sharp attenuation outside this band. Automatic volume control is desirable to control the output signal level with large variations in received signal strength. The audio-frequency output, resulting from demodulation of the signals received by the receiver, is applied to output conductors 153.

In order to mute the receiver when the system is in transmitting condition, the change-over relay 119 is provided with a contact 155 which in front or closed position energizes a quick-acting receiver muting relay 157 having a normally open contact 159. Movement of contact 159 to its front position shorts the output conductors 153, and by such action stops further progress of any audio-frequency signal which the receiver might extraneously pick up when not connected to the phase-wire 2.

When relay 119 is deenergized, all its contacts 117, 129 and 153 move to back positions. In back position, contact 117 connects cable 103 to the receiver 115; contact 129 opens plate-supply circuit 127, blocking further progress of the oscillations produced by the crystal oscillator 121; and contact 155 deenergizes muting relay 157 which thereupon releases its contact 159, thus opening the short around receiver output conductors 153.

Summarized, when the change-over relay 119 is energized, the carrier system is prepared to transmit and when the relay 119 is deenergized the carrier system is prepared to receive. Preferably, the relay 119 is such that when energized its contacts operate in a rapid sequence such that the receiver is first muted, then the cable 103 connected to the carrier, and finally carrier is established by the contact 129; and when deenergized, the reverse sequence takes place. This causes the receiver to be muted before outgoing carrier is applied, so that no received signal is on the carrier-equipment when it is transmitting.

For telephony, the carrier-current equipment further includes a pair of telephone wires 161 for incoming and outgoing calls, a tuned ringing circuit 164 tuned to line-ringing frequencies of, in this case, 16-25 cycles for outgoing ringing, a normally-open ringing circuit 165 for incoming ringing, and a hybrid network 167 for providing the two-wire telephone line 161 with separate outgoing and incoming paths for telephony signaling, these paths comprising a pair of outgoing signal conductors 169 and incoming signal conductors 171, respectively.

Outgoing conductors 169 for outgoing telephony lead into an outgoing speech amplifier 173, including electronic-tubes, for raising and controlling the speech level. The output of the speech amplifier 173 is applied to conductors 175 to which the output of a 1000 cycle outgoing call oscillator 177 is also controllably connectible through contacts 179 of a relay 180 controlled by a normally open contact 181 of relay 163 or by a normally open manually-operated push-button 182. In order to apply a clear ringing signal to the conductors 175 for carrier transmission, the relay 180 is provided with an additional contact 183, which in closed or front position shorts the conductors 169 to the speech amplifier 173 when the contacts 179, in their front position, connect the oscillator 177 to the conductors 175. With the contacts 179 and 183 in back, open positions, the oscillator 177 is disconnected from the conductors 175 and the conductors 169 are not shorted.

Unless the conductors 175 are shorted, any signal thereon is fed to an audio-frequency-operated transmitting control-device 185 and to a low pass filter 187.

The control-device 185 is responsive to audio-frequency input, amplifying and rectifying it to energize a control relay 189 having a normally-open contact 190 which, when closed, completes a circuit 191, 190, 192, under suitable conditions. Energization of this circuit energizes the change-over relay 119 for connecting the transmitter 113 to the cable 103. The relay 189 is somewhat slow to release but fast operating so that its contact 190 holds in front or closed position between speech syllables and short pauses in talking, and thereby assures continuous transmission of the carrier during outgoing speech.

The low pass filter 187 passes frequencies below a cut-off frequency of 2400 cycles in the described embodiment, since speech including frequencies up to this value is understandable. Frequencies above 2400 cycles are highly attenuated and do not appear to any significant extent at the output of the low pass filter 187. This output is connected to the conductors 143, leading to the modulating means of the transmitter 113, so that the carrier can be speech modulated with frequencies at or below 2400 cycles, when outgoing speech is on the telephone wires 161, or can be modulated with 1000 cycles, delivered by the calling oscillator 177, for ringing.

In the reception of telephony, demodulated incoming carrier signals appear as audio-frequencies on the conductors 153, and reach a low pass filter 193 that is like the low pass filter 187, passing on audio-frequencies at and below 2400 cycles to the conductors 195 and absorbing higher frequencies. The conductors 195 feed the energy thereon to a transmitting disabler control 197, an incoming speech amplifier 199, and a tuned incoming-call amplifier 201 tuned sharply to 1000 cycles.

The disabler control 197 is responsive to audio-frequency signals, speech or otherwise, on the conductors 195, amplifying and rectifying the signal and applying the result to a disabling relay 203 which is fast operating but somewhat slow-to-release, the release being adjustable in the preferred embodiment up to about ½ second, but longer than the release time of the control relay 189. The disabler relay 203, when energized, moves its normally-closed contact 205 to open position, opening the energizing circuit 191—190—192 to the change-over relay 119. The slow release of contact 205 keeps this energizing circuit open between syllables or words in speed reception. Another normally-open contact 207 of the disabler relay is closed for shorting the conductors 175 thereby preventing outgoing speech or audio-frequency signaling thereon during signal reception.

The incoming speech amplifier 199 amplifies and controls the level of the speech frequencies it receives, the output of the amplifier 199 being connected to the hybrid network 167 so that received speech is passed on to the telephone line 161. The hybrid network 167 need not be exactly balanced to the telephone lines, only approximate balance being satisfactory, because any signal which might pass beyond the outgoing speech amplifier 173, during reception, is blocked by the closed contact 207 of the disabler relay 203.

The incoming-call amplifier 201 is sharply tuned to 1000 cycles, and is amplifying and also rectifying. Part of the output of the amplifier 201 is 1000 cycles, and goes, via a circuit 208, to a resistor 209 where it is dissipated. Another part of the output of the amplifier is rectified current for actuating a quick-acting relay 210. Energization of this relay moves its normally-open contact 211 to closed position, short-circuiting an auxiliary slow-to-release normally-energized relay 213 which is in a normally-closed energizing circuit including a protective resistor 215. Upon deenergization, the relay 213 releases its contact 217 which in its back position closes a circuit to incoming ringing relay 219. The auxiliary relay 213 is fast operating and slow to release so that momentary sounds of 1000 cycles, occurring in speech, will not energize the relay 210 sufficiently long to allow the relay 213 to drop its contact 217 into closed position. In the application of the system, the ringing should be permitted for a time longer than that necessary for the auxiliary relay 213 to release.

Relay 219, when energized, at its contacts 221, disconnects the resistor 209 from the circuit 208 and substitutes the loud speaker 223 which thereupon emits a 1000 cycle sound. The relay 219 also closes its normally-open contacts 225 for connecting the incoming-call ringing circuit 165 to the telephone line 161, and opens its normally-closed contact 227 to interrupt the circuit of the outgoing-ringing relay 163, although this contact 227 may be omitted because, during reception, the closed contact 207 of the disabler relay 203 prevents progress of any audio-frequency therebeyond.

Each carrier-current equipment, such as shown in Fig. 2, is associated with a station that may be the terminus of one or more line-sections, and may be associated with one or more relaying points each having a relay-means E. In accordance with my invention, each line-section can be protected in the manner shown in Fig. 4; but for a transmission line comprising a plurality of line-sections, for which my invention is particularly applicable, a single carrier frequency is used and a single carrier-current equipment can serve a plurality of relaying points on different line-sections. Such a protected transmission line is symbolically represented in Fig. 5 as comprising a plurality of stations X, Y and Z, interconnected by line-sections X—Y, X—Z and Y—Z. Each line-section is arbitrarily assigned an audio-frequency which is above the highest significant by-pass frequency of the low pass filters 187 and 193, or above 2400 cycles, such higher audio-frequency being used for modulation of the carrier for relaying signaling. In the specific embodiment being used as illustrative of the invention, a frequency of 3000 cycles is assigned to line-section X—Y which is about 300 miles long, a frequency of 4000 cycles to line-section X—Z which is about 200 miles long, and a frequency of 5000 cycles to line-section Y—Z which is about 125 miles long.

Figure 5:
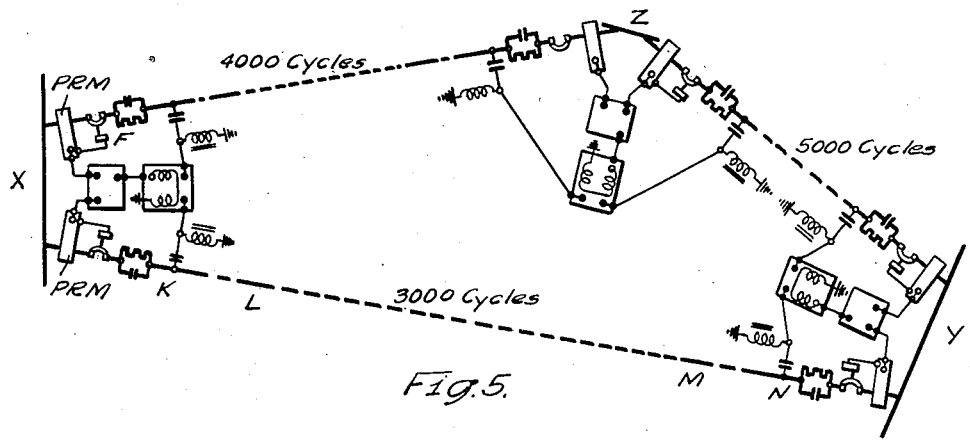
Fig. 5 is a symbolic diagram, in single line form, of a protected transmission line system having a plurality of stations interconnected by a plurality of protected line-sections having means for telephonic intercommunication, in accordance with my invention.

In the system shown in Fig. 5, each station includes an end of two different line-sections. In furtherance of my invention, the transmitter of the carrier-current equipment at a station can be modulated by either of two audio-frequency signaling oscillators, each oscillable at a frequency corresponding to the line-section which it serves, and the receiver feeds two tuned filter amplifiers for selecting the audio-frequency associated with the line-sections thereof, at which the carrier may have been modulated by the signaling oscillators. The number of modulators and selectors to be provided will depend, in general, on the number of relaying points at a station, or a combination of them, so that the number may be fewer or greater than two. The modulation and selection devices hasten the clearance of a line-section faulted in an end-zone, and for this purpose interrelating or control means are included between each protective relaying means for the line-sections at a station and the single carrier-current equipment thereat. These control means comprising the various interconnecting circuits PTR, TS—1, TS—2 and CS. Since two relaying means of two different line-sections are shown associated with each carrier-current equipment, a prefix 1 has been applied to the interconnecting circuits in Fig. 2 to indicate those which extend to the relaying means of one line-section, and a prefix 2 to indicate those which extend to the relaying means of the other line-section at the station.

Referring to Fig. 2, since two line-sections terminate at a station, two signaling audio frequency oscillators are provided, one for each line-section, which modulate the transmitter 113, and comprise normally dormant oscillators 240 and 242 capable of oscillating at the frequency assigned to the associated line-section terminating at the station. Oscillators 240 and 242 are made to oscillate when their respective circuits 244 and 246 are closed. Circuit 244 is closed when a normally-open contact 248 is moved to its front or closed position by energization of a quick-acting carrier-relaying relay 250 in the carrier-start circuit 1—CS of the protective relaying means for the associated line-section, and circuit 246 is similarly closed by closure of a normally-open contact 252 of a quick-acting carrier-relaying relay 254 controlled by the carrier-start circuit 2—CS of the other protective relaying means for the other line-section at the same station. When a signal oscillator 240 or 242 oscillates, it applies modulation current, of its own frequency, to the circuit 144 or 145 as the case may be. Such signal is applied, through conductors 142, to the modulation components of the transmitter 113.

The modulated carrier is a relaying impulse or signal which supersedes any other activity of the carrier-system. To this end each of the carrier-relaying relays 250 and 254 is provided with a normally-open contact 256, 258 and 260. Closure of a contact 256 shorts the conductors 175, preventing the passage thereon of outgoing speech or outgoing call oscillations in a manner similar to that already described in connection with the disabler control relay 203 and its contact 207. Closure of a contact 258 completes an independent energizing circuit 191—258—192 to the change-over relay 119, thereby putting the carrier-current equipment at the station in transmitting condition irrespective of the condition of the circuit 191—190—192. Closure of a contact 260 completes an obvious circuit to the power-raise relay 149 which closes its contact 148 to short the resistor 147 and raise the power of the transmitter. Accordingly, the transmitter 113 will apply a relatively high-power carrier, modulated by one of several audio-frequencies, to the phase-wires 2 to which the transmitter is coupled, when a relay 250 or 254 is energized by closure of the associated carrier-start circuit. At station X the outgoing modulating frequencies may be 3000 or 4000 cycles, at station Y 3000 or 5000 cycles, and at station Z 4000 or 5000 cycles. A carrier may be modulated with more than one relaying audio frequency.

A receiver 115 at a station which receives a carrier, demodulates it, and applies the audio-frequency to the conductors 153 of the carrier-current equipment at such station. The received current, in addition to being fed to the low pass filter 193, is also applied to tuned filter amplifiers 262 and 264, tuned respectively to 3000 and 4000 cycles at station X, to 3000 and 5000 cycles at station Y and to 4000 and 5000 cycles at station Z.

Assuming a relaying signal modulation, the audio-frequency is too high to pass the low pass filter 193. A particular received audio signal is selected for amplification and rectification in the amplifier 262 for operating a time-decrease relay 266 in response thereto, the contacts 268 of which close the two timer shunting circuits 1—TS—1 and 1—TS—2 of the associated protective relaying means. The other audio signal will be amplified and rectified in the amplifier 264, for operating a time-decrease relay 270 in response thereto, the contacts 271 of which close the two timer shunting circuits 2—TS—1 and 2—TS—2 of the other protective relaying means at the station. The contacts 268 and 271 may be quick opening or slightly delayed in opening. Transmitted speech frequencies do not affect the tuned filter amplifiers 262 and 264 because audio-frequencies above 2400 cycles are not applied to a carrier transmitting speech intelligence, such higher frequencies having been eliminated by the low pass filter 185 of the outgoing circuit at the sending station.

It is desirable to have the carrier-current equipment at a far end receiving station placed quickly into receiving condition in response to an end-zone fault at the other end of the line-section. For this purpose, each carrier equipment is provided with as many quick-acting "prepare-to-receive" relays as there are relaying points at the station each relay being operated by the associated circuit PTR. Such relays 272 and 273 control normally closed contacts 274 and 276 respectively series connected in the energizing circuit 191—190—192 of the change-over relay 119, this circuit being otherwise closed when outgoing telephony is taking place. Each of the prepare-to-receive relays 272 and 273 is in the respective "prepare-to-receive" circuit PTR of its associated relay-means.

Figure 6:
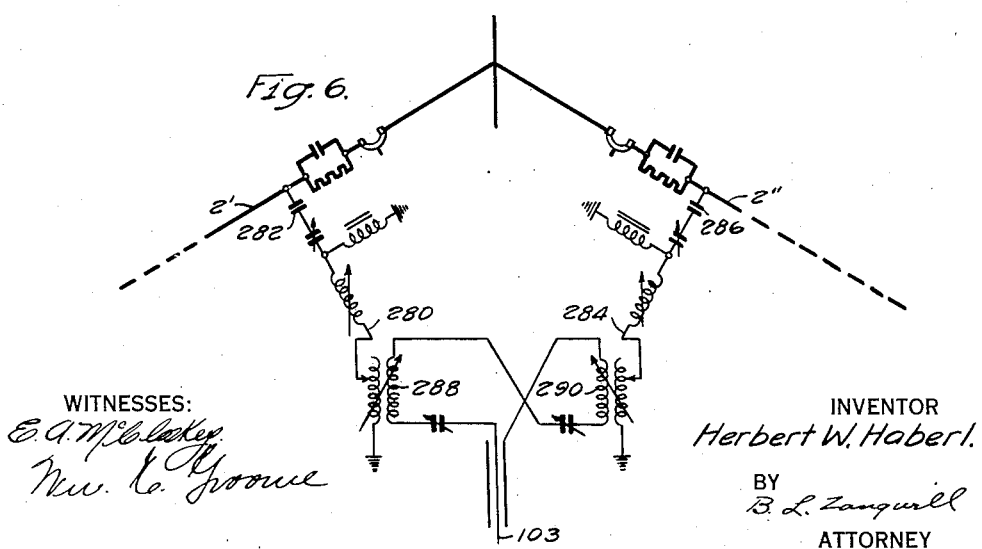
Fig. 6 is a symbolic diagram showing the coupling of a single carrier-current equipment to a plurality of line-sections.

The carrier-current equipment can be coupled to two line-sections at a station in any suitable manner. Figure 6 shows in a simplified manner the basic elements in a form now preferred by me, such coupling being especially desirable where parts of the line-sections, near a station, are strung on the same poles or towers. The phase-wire 2' of one line-section is provided with a coupling circuit 280 including the coupling capacitor 282; and the phase-wire 2" with a similar coupling circuit 284 including a coupling capacitor 286. The coaxial cable 103 has its line-end terminating in a winding 288 magnetically coupled to the circuit 280, and a winding 290 magnetically coupled to the circuit 284. The magnetic couplings are variable for dividing the carrier power so that the power to each phase-wire can be properly proportioned. In general the power-division will depend, in some manner, on the length of each line-section. Additional variable inductances and capacitors may be used for providing the necessary tunings and impedance matching between the high frequency transmission cable and the load or loads.

*Normal condition of carrier current equipment*

Normally the carrier-current equipment is in standby condition for telephonic communication with the circuit 191—190—192 open at the contact 190 only and the circuit 191—258—192 open at the contacts 258 so that the antenna change-over relay 119 is deenergized. The contact 117 of the relay 119 will therefore be in its back position, connecting the cable 103 to the receiver 115. Accordingly, all carrier-current equipments are in condition to receive.

*Telephonic communication*

Assuming a party at station X desires to call a party at station Y, so that station X is an outgoing signaling station and Y an incoming signaling station.

The carrier-current equipment at X will have ringing voltage applied to its telephone line 161, energizing relay 163 which causes the relay 180 to operate and apply outgoing calling oscillations of 1000 cycles to the conductors 175. The transmitter control device 185 responds to signals on the conductors 175 and causes the antenna change-over relay 119 to connect the transmitter 113 to the cable 103 to activate the transmitter for telephony through the contact 129, and to mute the receiver through the contact 155. The 1000 cycle ringing signal also passes through the low pass filter 187 onto the conductors 142 so that the transmitted carrier is modulated with this ringing signal.

At station Y the ringing signal, coming in on the conductor 103, passes through the contact 117, in normal back position, to the receiver 115 which demodulates the carrier and applies the 1000 cycle telephonic ringing signal to the conductors 153. This signal has no effect on the tuned filter amplifiers 262 and 264 which are tuned for a range in 3000 and 5000 cycles, at station Y. This signal, however, passes through the low pass filter 193, part going in the transmitter disabler control 197 which causes operation of contacts 205 and 207 for preventing transmission of carrier, part going to the tuned incoming call amplifier 201, and part going to the incoming speech amplifier 199 which can be ignored. The part going into the incoming speech amplifier 201 is amplified and a fraction of the output operates the relay 210 through which the relay 219 is energized for connecting the ringing circuit 165 to the telephone wires 161 so that an incoming ringing signal of low frequency, such as customarily used, is applied to the telephone wires 161 at station Y.

The party communicating through station X may permit the ringing signal to operate in code, for example long equally spaced signals for the station Y and groups of spaced signals for the station Z. In this manner each station will know when it is being called.

After a suitable period to permit the called party to answer the call, the party at X may apply speech to the wires 161 thereat which divides two ways at the hybrid network 167, part being lost against the output of the incoming speech amplifier 171 but the part to be transmitted entering the outgoing speech amplifier 173, where the speech signal is amplified and applied to the conductors 175. This speech signal then controls the transmitting control device 185 in the same manner as did the outgoing calling signal of 1000 cycles. It also is applied to the low pass filter 187 which removes speech frequencies above 2400 cycles, the lower frequencies passing to the conductors 142 for modulating the transmitter 113 with speech. The resulting speech modulated carrier is applied to the conductor 2.

At the receiving station Y the received speech, from which frequencies above 2400 cycles have been removed, passes through the low pass filter 193, is amplified by the incoming speech amplifier 199, and is applied to the telephone wires 161 through the hybrid network 167. If an attempt is made to talk while listening, the speech is blocked by the slow acting disabler relay 203 and no speech will be transmitted until after the distant talker has stopped talking and the disabler relay has deenergized and its contacts 205 and 207 have dropped. This means that a short pause is necessary after one party ceases to talk and before the other party answers, in order to avoid the possibility of both parties talking together and neither hearing the other.

In the same manner, any party at any station X, Y, or Z can communicate with any other party at a different station of the group.

*Central zone fault in any line-section*

In the event of a fault in a central zone of a line-section, each of the protective relaying means at the line-section ends quickly energizes the associated trip-bus 55 through at least one of its quick acting first-zone contacts and directional contacts. The quick energization of the tripping circuits 57—58 at both stations at which the line-section terminates, causes segregation of the faulted line-section solely through the action of the protective relaying means. Although the relays 62 at each end are also energized, thereby preventing any communication by the associated carrier-current equipments, each tripping-circuit resets itself into open or deenergized condition through the action of the relays 64 and 71, so that the carrier-start relays 62 are soon deenergized and the carrier-current equipments transferred back to normal condition after the line-section has been segregated.

End zone fault in any line-section

For an end-zone fault the sequence of operations at the near end and far end of the line-section are different.

At the near end, a first-zone contact and its directional contact will be closed so that quick tripping occurs at this end, as described. Quick energization of the tripping circuit, however, also causes quick closure of the carrier-start circuit CS, thereby energizing one of the carrier-relaying relays 250 and 254, depending on which line-section it is faulted. An energization of a carrier-relaying relay, through operation of its contacts, causes the carrier, with a relaying signal superimposed, to be quickly transmitted by the carrier-current equipment at the near end station, irrespective of the prior condition of this equipment. To this end, a contact 258 of a carrier-relaying relay causes positive predominating energization of the change-over relay 119 through the circuit 191—253—192; a contact 256 shorts the telephony conductors 175; and a contact 248 or 252 applies the modulating signal associated with the faulted lines-section to the carrier, the power of which is raised through action of a contact 260. Consequently, although a carrier-current equipment at a station may be associated with several line-sections, it will immediately impose a carrier on the transmission line with raised power, but modulated only with the audio-frequency relaying signal associated with the faulted line-section.

The action of a carrier-relaying relay takes place whether the carrier-current equipment at the near end is dormant, is in receiving condition, or is in telephony transmitting condition. If the carrier-current equipment is dormant, or in receiving condition with a contact 205 open the quick closing of the carrier-start circuit CS nevertheless causes the relay 119 to connect the cable 103 to the transmitter for instantaneously transmitting the relaying signal. Should the carrier-current equipment at the near end be in condition for transmitting telephony, a contact 256 prevents progress of the outgoing telephonic signals on the conductors 175 to the transmitter control device 185 and the low pass filter 187, thereby preventing interference with the aforesaid carrier relaying signal. Some time, however, is saved because the relay 119 is already energized and the carrier on.

At the far end, a first-zone contact is not operated but a longer-zone contact is operated, energizing a relay 42 or 44 for quickly closing the prepare-to-receive circuit PTR before a timer relay 40 or 46 operates its contact. This circuit PTR, when closed, causes quick energization of an associated prepare-to-receive relay 272 or 273 depending on the particular line-section faulted. The responsive relay 272 or 273 causes quick opening of the circuit 191—190—192 to the relay 119, even if outgoing telephony may have caused previous closure of this circuit at the contact 190. Since the far end carrier-start circuit is not energized, so that the other energizing circuit 191—258—192 for the relay 119 is also open, the far end carrier-current equipment either will be in receiving condition, or will be immediately placed in such a condition for receiving the relaying signal transmitted from the line-section end where the end-zone fault has arisen. This received relaying signal will operate a time-decrease relay 266 or 270 depending on the particular modulation signal of the transmitted carrier so that the associated shorting circuit TS—1 and TS—2, associated with the faulted line-section, will be closed at the carrier-current equipment. This short-circuits the slow-operating contacts 42 and 50 of the associated protected relaying means. Since a longer-zone contact is already closed, with its directional contact for a fault, immediate energization of the far end trip-circuit 57—58 for the faulted line-section only results, this trip-circuit being sealed-in or maintained energized through seal-in relay 60 and the somewhat delayed opening action of the time-decrease relays, so that closure of the associated carrier-start circuit CS when the far end trip-circuit 57—58 is energized comes after the tripping action is initiated. If desired an additional contact may be added to the time-decrease relays 266 and 270 for quickly opening the associated carrier-start circuit in response to a received relaying signal; in which case the relays 266 and 270 can be quick to open and close.

After the tripping operations at both ends have been completed for the faulted line-section and the trip-circuits deenergized through the reset relays 71, the carrier-current equipments are restored to normal condition for telephonic communication over the transmission line and also for providing high speed carrier relaying protection for the other unfaulted line-sections which are still connected in the transmission line.

The invention is such that false tripping does not occur when an out-of-step condition arises. During a non-fault out-of-step condition the current slowly rises and a relay 30 opens its associated first-zone circuit 74—75 before the setting of the timer contact 42. Should a fault occur suddenly increasing the current, a first-zone phase contact will close before its associated circuit 74—75 is opened, or after this circuit has been reset closed, or a first-zone ground contact 26 will close. If the longer-zone contacts remain closed through fault conditions, the timer relay 40 is maintained energized for closing its contact 42, establishing additional and backup protection.

It may be observed that when a protective relaying means closes the associated carrier-start circuit CS, it also closes the associated prepare-to-receive circuit PTR. However, the latter has no particular effect on the carrier-current equipment because, although it opens the circuit 191—190—192 through the relay 119 at a point associated with a contact of a relay 272 or 273, the other circuit 191—258—192 to the relay 119 has been quickly completed by a carrier-start relay 250 or 254.

The elapsed time between energization of a carrier-start circuit CS at a near end station and the closure of a time-decrease relay 266 or 270 for closing the shorting circuits TS at the far end station, is in the order of about one cycle on a 25 cycle base with quick-acting relays. If the carrier-current equipment at the near end is transmitting telephony, so that the carrier is already on, the elapsed time is somewhat less, being in the order of ¾ of a cycle. If the near end carrier-current equipment is receiving telephony, the time-loss may be in the order of 1½ cycles on the same base, which represents the worst case.

Although a transmitted carrier is broadcast over the transmission line to more than one receiving-current equipment, only one relay responds to the carrier relaying signal, that relay being the one associated with the particular audio frequency used to modulate the transmitted carrier, and which corresponds to the faulted line-section.

While I have described my invention in a preferred manner and form, it is evident that it is subject to many modifications and different embodiments within the teachings thereof.

I claim as my invention:

1. An invention of the type described comprising an electric power transmission line comprising a plurality of stations interconnected by a plurality of line-sections, a plurality of line-interrupting means operable for segregating a faulted line-section, protective relaying means for said line-sections for operating said line-interrupting means as aforesaid in response to an internal fault in a line-section, in combination with a plurality of carrier-current equipments, one at each station, cooperable at a common fundamental carrier frequency, each comprising transmitting means, receiving means and means for selectively coupling either said transmitting means or said receiving means to said transmission line, said coupling means normally tending to couple said receiving means, in receiving condition, to said transmission line, and means at each station operable by a line-interrupting operation of said protective relaying means for operating said coupling means for coupling the transmitting means at such station to said transmission line.

2. An electric power transmission line comprising a plurality of stations interconnected by a plurality of line-sections, each line-section being provided at each end with protective relaying means and line-interrupting means operable thereby, a plurality of carrier-current equipments each operable at a common fundamental carrier frequency, there being a carrier-current equipment at each station, comprising transmitting means, receiving means and means for selectively coupling either the transmitting means or receiving means to said transmission-line but normally coupling said receiving means, in receiving condition, to said transmission line, a control means at each station for operating said coupling means in response to a line-interrupting operation of said protective relaying means, for coupling the transmitting means at such station to said transmission line and causing a relaying signal, distinctive to the faulted line-section, to be transmitted, means for adapting a plurality of said carrier-current equipments for telephonic communication over said transmission line, comprising a plurality of telephone-conductors associated with each of the last said carrier-current equipments, a control means for operating a coupling means in response to outgoing telephonic communication on said conductors for coupling the associated transmitting means to said transmission line, and means for preventing such coupling by the last said control means in response to incoming telephonic communication to said telephone-conductors.

3. The apparatus of claim 2 characterized by the first said control means predominating over the last said control means in its effect on said coupling means.

4. An electric power transmission line comprising a plurality of stations interconnected by a plurality of line-sections, each of said line-sections having a relaying point at each end, there being at least one station having a plurality of relaying points thereat, a line-interrupting means for each relaying point, each relaying point having protective relaying means for detecting fault conditions in the associated line-section, including means responsive to a near end-zone fault for quickly operating the associated line-interrupting means, and responsive to a far end-zone fault for operating the associated line-interrupting means after a time-delay period, carrier-current equipment associated with each station, comprising a single transmitter and a receiving means for transmitting and receiving a carrier-current of a common fundamental frequency over the line-sections terminating at the station, means for utilizing said carrier-current equipment for telephonic communication, interrelating means responsive to an end-zone fault in any line-section for preventing telephonic communication by the carrier-current equipment at the stations at which the faulted line-section terminates, and causing the carrier-current equipment at the near end to transmit a relaying-signal, the relaying signal for each line-section being distinctive, the last said means causing the carrier-current equipment at the far end to receiving said relaying-signal, the receiving means at each station having selecting means for decreasing said time-delay period for operation of the line-interrupting means of the line-section in response to the associated relaying signal.

5. A protected line-section having a relaying point and circuit-breaker means at an end thereof, comprising in combination therewith, protective relaying means for operating said circuit-breaker means in event of a fault in the line-section, carrier-current equipment for transmitting intelligence communication over said line-section at a relatively lower carrier power, means responsive to operation of said protective relaying means for inhibiting said intelligence communication and superimposing a protective relaying signal for transmission over said line-section at a relatively higher carrier power.

6. The combination with a protected line-section including, at each end thereof, line-interrupting means and protective relaying means responsive to internal faults, including an internal end-zone fault, for operating said line-interrupting means; of carrier-current equipment at each end for transmitting and receiving carrier, said carrier-current equipment including means providing intelligence communication between said ends, carried by said carrier with a relatively lower power, and means associated with said protective relaying means and the associated carrier-current equipment, responsive to a fault in said end-zone, for inhibiting said intelligence communication and providing for a relaying signal carried by said carrier with a relatively higher power, and means responsive to a received relaying signal for affecting, in some manner, the operation of said line-interrupting means.

7. An electrical line-section having a relaying point and a circuit-breaker means, comprising in combination therewith, protective relaying means including shorter-zone and longer-zone distance responsive devices, an energizable trip-circuit including means operable upon energization of said trip-circuit for operating said circuit-breaker means, a circuit-means responsive to a fault, for causing energization of said trip-circuit by an operation of said shorter-zone distance responsive device, a carrier-current equipment coupled to said line-section and associated with said protective relaying means, a first interrelating-means responsive to an energizing operation of said circuit-means for causing said carrier-current equipment to transmit a relaying signal over said line-section, a second interrelating-means responsive to an operation of said longer-zone distance responsive means for placing said carrier-current equipment in condition for receiving a carrier transmitted relaying signal, and means for causing said first interrelating-means to predominate over said second interrelating-means in its action on said carrier-current equipment in the event that both said distance responsive devices at said relaying point operate.

8. An electric-power transmission line having a line-section and a circuit-breaker means at each end of the line-section, comprising in combination therewith, protective relaying means comprising a shorter-zone distance responsive device at one line-section end and a longer-zone distance responsive device at the other line-section end, an energizable trip-circuit at each line-section end for operating, when energized, the associated circuit-breaker means, a first circuit-means at said one end responsive to a fault and operable by operation of said shorter-zone distance responsive device for causing energization of the associated trip-circuit, a second circuit-means at said other end responsive to a fault and operable a time-delay period after an operation of said longer-zone distance responsive device for causing energization of the associated trip-circuit, a carrier-system coupled to said line-section, having carrier-current equipment associated with each of said line-section ends, a first interrelating-means responsive to an energizing operation of said first circuit-means for causing the carrier-current equipment at said one line-section end to transmit a relaying signal over said line-section, a second interrelating-means instantly responsive to an operation of said longer-zone distance responsive means for maintaining said carrier-current equipment at said other line-section end in receiving condition, and means operable in response to a received carrier-transmitted relaying signal for causing energization of the trip-circuit associated with said longer-zone distance responsive device before expiration of said time-delay period.

9. An electrical line-section having a relaying-point and a circuit-breaker means at each end, comprising in combination therewith: self-sufficient protective relaying means comprising, at each end of the line-section, shorter-zone and longer-zone distance responsive devices, an energizable trip-circuit for operating, when energized, the associated circuit-breaker means, a first circuit-means responsive to a fault for energizing said trip-circuit upon an operation of said shorter-zone distance responsive device, and a second circuit-means responsive to a fault for energizing said trip-circuit a time-delay period after an operation of said longer-zone distance responsive device; a carrier-system coupled to said line-section and associated with said protective-relaying means; a first interrelating-means operably responsive to an energizing operation of one of said first circuit-means for causing said carrier-system to transmit a relaying signal over said line-section; a second interrelating-means instantly operably responsive to an operation of one of said longer-zone distance responsive means while its associated shorter-zone distance responsive device is inoperative, for placing said carrier-system in condition for receiving a signal; and means operable by said carrier-system in response to a received carrier-transmitted relaying signal for causing energization of the associated trip-circuit before expiration of said time-delay period.

10. An electric power transmission line having a line-section and a circuit-breaker means at each line-section end, comprising in combination therewith, a protective relaying means at each end of the line-section, comprising shorter-zone and longer-zone distance responsive devices, an energizable trip-circuit for operating, when energized, the associated circuit-breaker means, a first circuit-means operably responsive to a fault for energizing said trip-circuit upon an operation of said shorter-zone distance responsive device, a second circuit-means operably responsive to a fault for energizing said trip-circuit a time-delay period after an operation of said longer-zone distance responsive device, and means operable a second time-delay period after operation of said longer-zone distance responsive device for preventing energization of said trip-circuit by said first-circuit means, said second time-delay period being shorter than the first said time-delay period; a carrier-current equipment coupled to each end of said line-section; a first interrelating-means operably responsive to an energizing operation of said first circuit-means for causing the associated carrier-current equipment to transmit a relaying signal over said line-section; a second interrelating-means instantly operably responsive to an operation of said longer-zone distance responsive means without an operation of said shorter-zone distance responsive means, for placing said associated carrier-current equipment in condition for receiving a carrier transmitted relaying signal; and means responsive to a received relaying signal for causing energization of the associated trip-circuit before the expiration of the first said time-delay period.

11. The invention of claim 9 characterized by including means for causing said first interrelating means to predominate, in its action on said carrier-system, over said second interrelating means when both said shorter-zone and longer-zone distance responsive devices at a line-section end are operated.

12. The invention of claim 10 characterized by including means for causing said first interrelating means to predominate, in its action on said carrier-system, over said second interrelating means when both said shorter-zone and longer-zone distance responsive devices at a line-section end are operated.

13. Electrical protective means at a relaying point of a line-section having a circuit-breaker means at an end thereof, comprising in combination, a relay-means including shorter-zone and longer-zone distance responsive devices, an energizable trip-circuit for operating the circuit-breaker means when energized, a first circuit-means operable, at times, for energizing said trip-circuit upon an operation of said shorter-zone distance responsive device, and a second circuit-means operable, at times, for energizing said trip-circuit a time-delay period after an operation of said longer-zone distance responsive device; a carrier-current equipment coupled to said line-section, said carrier-current equipment comprising a change-over means for selectively transmitting or receiving a carrier, a first interrelating means operable, at times, in response to operation of said shorter-zone distance responsive device for causing said change-over means to select carrier-transmission with a relaying signal, a second interrelating means operable, at times, in response to operation of said longer-zone distance responsive device for causing said change-over means to select carrier-reception.

14. Electrical protective means at a relaying point of a line-section having a circuit-breaker means at an end thereof, comprising in combination, a relay-means including a shorter-zone and a longer-zone distance responsive device, an energizable trip-circuit for operating the circuit-breaker means when energized, a first circuit-means operable, at times, for causing energization of said trip-circuit upon an operation of said shorter-zone distance responsive device, and a second circuit-means operable, at times, for causing energization of said trip-circuit a time-delay period after an operation of said longer-zone distance responsive device, a carrier-current equipment coupled to said line-section comprising transmitting means and receiving means, a first interrelating means operable, at times, in response to operation of said shorter-zone distance responsive device for causing said transmitting means to transmit a carrier having a relaying signal, a second interrelating means operable, at times, in response to operation of said longer-zone distance responsive device for placing said receiving means in condition to receive carrier, and means operated by a received relaying signal for decreasing said time-delay period, said relaying signal being audio-frequency modulated carrier, said carrier-current equipment further comprising a telephony circuit, outgoing circuit-means connecting said telephony circuit to said transmitting means for modulating the carrier with speech from said telephony circuit, in a predetermined audio-frequency range not including said relaying signal, incoming circuit-means connecting said receiving means to said telephony circuit for applying thereto received speech in said audio-frequency range, said first interrelating means, when operating, rendering said outgoing circuit-means inoperative!

15. A protected line-section having, in combination at a relaying point thereof, protective relaying means operable in response to a fault-condition, circuit-breaker means operable by said operation of said protective relaying means, carrier-current equipment coupled to said line-section comprising transmitting means and receiving means, control means operable responsive to operation of said protective relaying means for causing said transmitting means to transmit a carrier having a relaying signal, a telephony circuit, outgoing circuit-means connecting said telephony circuit to said transmitting means for modulating the carrier with outgoing telephonic communication, different incoming circuit-means connecting said receiving means to said telephony circuit for applying thereto received telephonic communication, said control means, when operable, preventing telephonic communication by said carrier-current equipment, said incoming circuit-means comprising means for rendering said outgoing circuit-means ineffective for modulating the carrier when signals are received on said incoming circuit-means.

16. The combination with a protected line-section including line-interrupting means at each end thereof, protective relaying means at each end responsive to an internal fault in the central portion of said line-section for quickly operating both line-interrupting means, and responsive to an internal end-zone fault for quickly operating the line-interrupting means at the near end and operating the line-interrupting means at the far end after a time-delay period; of carrier-current equipment at each end of the line-section, coupled thereto for selectively transmitting or receiving a carrier of a predetermined relatively high frequency, said carrier-current equipment comprising a transmitting means selectively operable for applying a relay signal or a different intelligence signal to said carrier, and comprising a receiving means having means responsive to said intelligence signal and means responsive to said relaying signal, interrelating means operable by the last said means for decreasing said time-delay period, and interconnecting means at each station operable by the protective relating means thereat, for substantially instantly placing the carrier-current equipments at each end in condition for relaying signal communication only, in response to an internal end-zone fault in said line-section, with the receiving means at the far end in condition to receive a relaying signal.

17. An electric-power transmission line having a line-section and a circuit-breaker means at each end thereof, comprising in combination therewith, self-sufficient protective relaying means comprising a relay-means at each end of the line-section, each including shorter-zone and longer-zone distance responsive devices, an energizable trip-circuit for operating the associated circuit-breaker means, when energized, a first circuit-means operable, at times, for energizing said trip-circuit upon an operation of said shorter-zone distance responsive device, and a second circuit-means operable, at times, for energizing said trip-circuit a time-delay period after an operation of said longer-zone distance responsive device; a carrier-system coupled to said line-section, comprising telephony means operable, at times, for two-way telephonic communication by carrier; a first interrelating-means operably responsive to an energizing operation of said first circuit-means for causing said carrier-system to transmit a relaying signal over said line-section; a second interrelating-means operable, at times, in response to an operation of said longer-zone distance responsive means for placing said carrier in condition for receiving a relaying signal; and means for causing said first-interrelating means to predominate in its action on said carrier-system over said telephony means and said second interrelating means, and for causing said second interrelating-means to similarly predominate over said telephony means.

18. The invention of claim 17 characterized by said telephony means, when operable, modulating the carrier at audio-frequencies below a certain frequency and said relaying signal comprising carrier modulated with audio-frequency above said certain frequency.

19. A protected line-section including line-interrupting means at each end thereof, protective relaying means responsive to internal faults, including an internal end-zone fault, for operating both said line-interrupting means, carrier-current equipment at each end for transmitting and receiving carrier, said carrier-current equipment including a transmitter, a first modulating means operable for modulating said transmitter with audio frequency in a certain range for relaying signaling, and a second modulation means for modulating said transmitter with audio frequency outside said range for telephonic signaling, said carrier-current equipment further including a receiver, and selective means for providing distinctive paths for received relaying signals and telephonic signals, interrelating means including means at one line-section end, associated with said protective relaying means, responsive, in some manner, to an internal fault in a near end-zone for causing the transmitter to transmit said carrier and for causing operation of said first modulation means while preventing operation of said second modulation means, and including means at the other far end operable by the protective relaying means thereat in response to the last said fault for causing the receiver to receive the carrier transmitted relaying signal, and means responsive to a received relaying signal selected by said selection means, for affecting, in some manner, the operation of the line-interrupting means.

20. A protected line-section including line-interrupting means at each end thereof, protective relaying means responsive to internal faults, including an internal end-zone fault, for operating both said line-interrupting means, carrier-current equipment at each end for transmitting and receiving carrier, said carrier-current equipment including a transmitter, a first, a second and a third modulation means for modulating the transmitted carrier respectively for providing a relaying signal, speech communication and a telephonic calling signal, the said first modulating means operating in an audio-frequency range outside that of said second and third modulation means, said carrier-current equipment further including a receiver and selective means for providing distinctive paths for said relaying signal, speech communication and calling signal, interrelating means including means at one line-section end associated with said protective relaying means thereat, responsive, in some manner, to an internal fault in the near end-zone for causing said transmitter to transmit carrier and for causing operation of the said first modulating means while preventing operation of said second and third modulation means, and including means at the other far end, associated with the protective relaying means thereat, responsive to the last said fault for causing the receiver to receive the carrier transmitted relaying signal, means responsive to the received relaying signal for affecting, in some manner, the operation of said line-interrupting means, and means for placing control of said carrier-current equipment in said second and third modulation means for telephony between said line-section ends when no relaying signal is called for.

21. A protective system for an electric power transmission line-section having at each of separated relaying points thereof: protective relaying means, carrier-current equipment comprising a transmitter provided with audio frequency modulating means and a receiver having audio frequency output means, cable means coupled to said line-section, a change-over switching means selectively operable for operably connecting either said transmitter or said receiver to said cable means, said switching means being biased to operably connect said receiver to said cable means, a two-way telephony circuit, and outgoing and incoming circuit-means, comprising a hybrid coil device, respectively connecting said telephony circuit to said transmitter and receiver, respectively; in combination with means responsive to a protective action by said protective relaying means for disabling telephonic communication by said transmitter and substituting a carrier-current relaying signal for improved line-section protection, and disabling means, associated with each carrier-current equipment, for blocking outgoing signals on said outgoing circuit-means when said incoming circuit-means has a received signal thereon.

22. The invention of claim 21 characterized by said disabling means comprising a time-delay device for carrying over the said blocking action for short intervals.

23. A protective system for an electric power transmission line-section having at each of separated relaying points thereof: protective relaying means, carrier-current equipment comprising a transmitter provided with audio frequency modulating means and a receiver having audio frequency output means, cable means coupled to said line-section, a change-over switching means selectively operable for operably connecting either said transmitter or said receiver to said cable means, said switching means being biased to operably connect said receiver to said cable means, a two-way telephony circuit, and outgoing and incoming circuit-means, comprising a hybrid coil device, respectively connecting said telephony circuit to said transmitter and receiver, respectively, for telephonic communication with carrier-current modulated with audio frequency in a first predetermined range; in combination with means responsive to a protective action by said protective relaying means for disabling telephonic communication by said transmitter and substituting a carrier-current relaying signal for improved line-section protection, said relaying signal being modulated with audio frequency in a range different from the said first range, and disabling means associated with each carrier-current equipment for blocking outgoing signals on said outgoing circuit-means when said incoming circuit-means has a received signal thereon.

24. A protective system for an electric power transmission line-section having at each of separated relaying points thereof: protective relaying means, carrier-current equipment comprising a transmitter provided with audio frequency modulating means and a receiver having audio frequency output means, cable means coupled to said line-section, a change-over switching means selectively operable for operably connecting either said transmitter or said receiver to said cable means, said switching means being biased to operably connect said receiver to said cable means, a two-way telephony circuit, and outgoing and incoming circuit-means, comprising a hybrid coil device, respectively connecting said telephony circuit to said transmitter and receiver, respectively, for telephonic communication with carrier-current of relatively lower power modulated with audio frequency in a first predetermined range; in combination with means responsive to a protective action by said protective relaying means for disabling telephonic communication by said transmitter and substituting a carrier-current relaying signal for improved line-section protection, said relaying signal having relatively higher power and being modulated with audio frequency in a range different from the first said range, and disabling means, associated with each carrier-current equipment, for blocking outgoing signals on said outgoing circuit-means when said incoming circuit-means has a received signal thereon.

25. A protective line-section having a pair of spaced stations, protective relaying means at each station, carrier-current equipment at each station comprising a transmitter and a receiver, means comprising said transmitter and receiver for providing intelligence communication between said stations, means operable by a protective operation of said protective relaying means for preventing intelligence communication by said carrier-current equipment and providing a relaying signal by said carrier-current equipment, said transmitter comprising a constantly operating oscillator oscillating relatively weakly at carrier-current frequency, and means for amplifying and modulating the output of said constantly operating oscillator when said carrier-current equipment is called upon to transmit intelligence or relaying signals.

26. The invention of claim 25 characterized by means for causing the relaying signals to be of higher power than the intelligence signals.

HERBERT W. HABERL.